(12) United States Patent
Wang et al.

(10) Patent No.: US 8,576,506 B1
(45) Date of Patent: Nov. 5, 2013

(54) DISK DRIVE ESTIMATING READER/WRITER GAP ACROSS SERVO ZONES

(75) Inventors: Honge Wang, Irvine, CA (US); Michael Chang, San Jose, CA (US); Abhishek Dhanda, San Jose, CA (US); Huanxiang Ruan, Irvine, CA (US); Guoxiao Guo, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/529,817

(22) Filed: Jun. 21, 2012

(51) Int. Cl.
*G11B 5/09* (2006.01)

(52) U.S. Cl.
USPC ............. 360/50; 360/51; 360/39; 360/77.08

(58) Field of Classification Search
None
See application file for complete search history.

(56) References Cited

U.S. PATENT DOCUMENTS

| | | | |
|---|---|---|---|
| 5,208,556 A | 5/1993 | Wilson | |
| 5,384,671 A | 1/1995 | Fisher | |
| 5,418,659 A | 5/1995 | Shergill | |
| 5,739,994 A | 4/1998 | Ottesen et al. | |
| 5,796,535 A | 8/1998 | Tuttle et al. | |
| 5,861,766 A | 1/1999 | Baumer et al. | |
| 5,956,196 A | 9/1999 | Hull et al. | |
| 6,028,727 A | 2/2000 | Vishakhadatta et al. | |
| 6,084,738 A | 7/2000 | Duffy | |
| 6,118,604 A | 9/2000 | Duffy | |
| 6,178,056 B1 | 1/2001 | Cloke et al. | |
| 6,262,857 B1 | 7/2001 | Hull et al. | |
| 6,388,829 B1 | 5/2002 | Nazarian | |
| 6,411,452 B1 | 6/2002 | Cloke | |
| 6,441,981 B1 | 8/2002 | Cloke et al. | |
| 6,519,104 B1 | 2/2003 | Cloke et al. | |
| 6,628,171 B1 | 9/2003 | Chou et al. | |
| 6,873,483 B2 * | 3/2005 | Hetzler et al. | 360/51 |
| 6,943,978 B1 | 9/2005 | Lee | |
| 6,992,856 B2 | 1/2006 | Ehrlich | |
| 7,006,316 B1 | 2/2006 | Sargenti, Jr. et al. | |
| 7,012,773 B2 | 3/2006 | Ashikaga et al. | |
| 7,035,026 B2 * | 4/2006 | Codilian et al. | 360/31 |
| 7,054,083 B2 | 5/2006 | Ehrlich | |
| 7,072,128 B2 | 7/2006 | Ehrlich | |
| 7,075,742 B2 | 7/2006 | Ehrlich | |
| 7,092,177 B2 | 8/2006 | Ehrlich | |
| 7,388,817 B2 * | 6/2008 | Tsunoda | 369/47.28 |
| 7,405,893 B2 | 7/2008 | Bi et al. | |
| 7,453,661 B1 | 11/2008 | Jang et al. | |
| 7,715,138 B1 | 5/2010 | Kupferman | |

(Continued)

*Primary Examiner* — Muhammad N Edun

(57) ABSTRACT

A disk drive is disclosed comprising a head actuated over a disk comprising a plurality of servo sectors defining a plurality of servo tracks. The servo tracks form a plurality of servo zones. A disk locked clock is synchronized relative to a servo data rate of the servo zone the head is over. A first reader/writer gap is measured in cycles of the disk locked clock at a first servo track in the first servo zone. A second reader/writer gap is measured in cycles of the disk locked clock at a second servo track in the second servo zone. The first and second reader/writer gaps are normalized to generate a normalized first and second reader/writer gaps. A third reader/writer gap is estimated in cycles of the disk locked clock at a third servo track in the second servo zone based on the normalized first and second reader/writer gaps.

22 Claims, 12 Drawing Sheets

(56) References Cited

U.S. PATENT DOCUMENTS

| | | |
|---|---|---|
| 7,729,074 B2 | 6/2010 | Venkataramani et al. |
| 7,813,065 B2 | 10/2010 | Annampedu et al. |
| 7,843,662 B1 | 11/2010 | Weerasooriya et al. |
| 7,929,238 B1 | 4/2011 | Vasquez |
| 8,022,774 B2 | 9/2011 | Ueno et al. |
| 8,116,023 B1 | 2/2012 | Kupferman |
| 8,213,106 B1 | 7/2012 | Guo et al. |
| 2007/0064325 A1 | 3/2007 | Bi et al. |

* cited by examiner

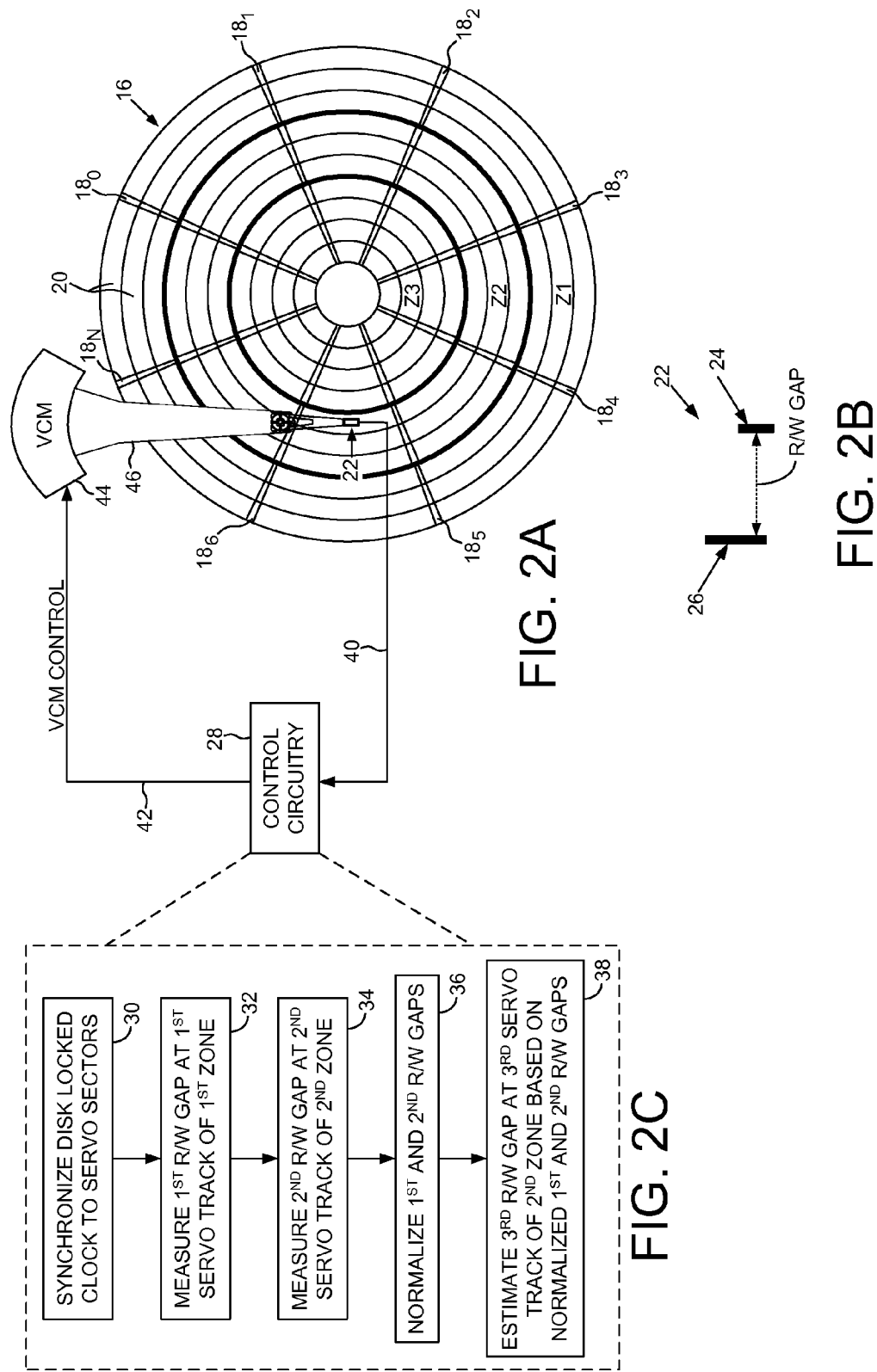

US 8,576,506 B1

DISK DRIVE ESTIMATING READER/WRITER GAP ACROSS SERVO ZONES

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the outer diameter of the disk (Z1) to the inner diameter of the disk (Z3).

The prior art disk format of FIG. 1 also comprises a number of servo sectors $6_0$-$6_N$ recorded around the circumference of the disk 2 that define a plurality of servo tracks, wherein the data tracks 4 are defined relative to the servo tracks. Each servo sector 6, may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, may further comprise groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations. In the embodiment of FIG. 1, the data rate of the servo sectors $6_0$-$6_N$ changes in each physical zone similar to the data sectors in order to improve format efficiency.

BRIEF DESCRIPTION OF THE DRAWINGS

FIG. 2A shows a disk drive according to an embodiment of the present invention comprising a head actuated over a disk.

FIG. 2B shows a head comprising a read element separated from a write element by a reader/writer gap according to an embodiment of the present invention.

FIG. 2C is a flow diagram according to an embodiment of the present invention wherein reader/writer gaps are measured for first and second servo tracks in first and second servo zones, the measured reader/write gaps are normalized, and a reader/writer gap is estimated for a third servo track in the second servo zone based on the first and second normalized reader/writer gaps.

DETAILED DESCRIPTION

Figure 1:
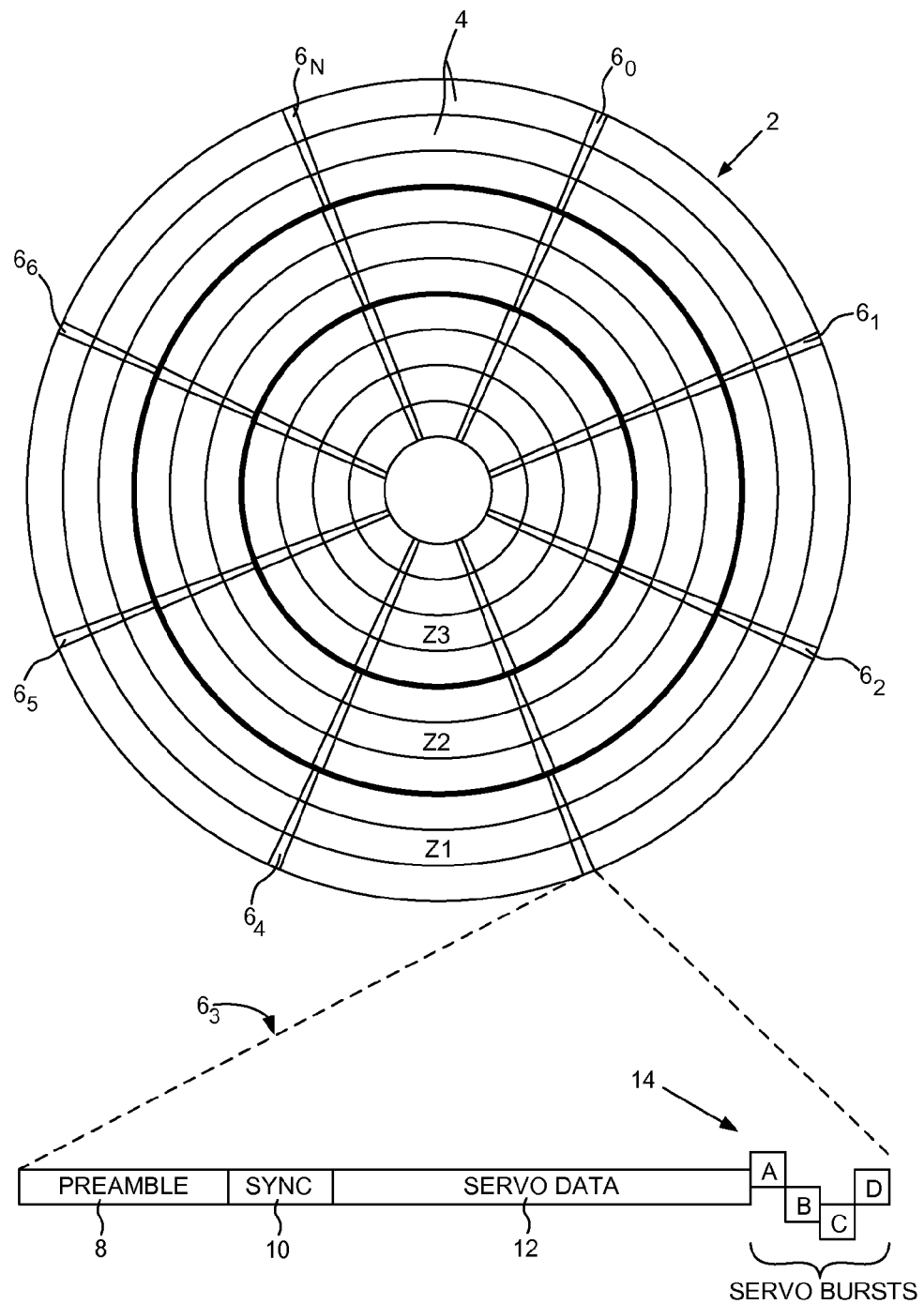
FIG. 1 shows a prior art disk format comprising a plurality of servo sectors recorded at varying servo data rates to define a plurality of servo zones.

FIG. 2A shows a disk drive according to an embodiment of the present invention comprising a disk 16 comprising a plurality of servo sectors $18_0$-$18_N$ defining a plurality of servo tracks 20. The servo tracks 20 form a plurality of servo zones (Z1-Z3), and a servo data rate of servo sectors $18_0$-$18_N$ in a first servo zone is different than a servo data rate of servo sectors in a second servo zone. The disk drive comprises a head 22 actuated radially over the disk 16, wherein the head 22 comprises a read element 24 separated from a write element 26 by a reader/writer gap (FIG. 2B). The disk drive further comprises control circuitry 28 operable to execute the flow diagram of FIG. 2C, wherein a disk locked clock is synchronized relative to the servo data rate of the servo zone the head is over (block 30). A first reader/writer gap is measured in cycles of the disk locked clock at a first servo track in the first servo zone (block 32), and a second reader/writer gap is measured in cycles of the disk locked clock at a second servo track in the second servo zone (block 34). The first and second reader/writer gaps are normalized to generate a normalized first and second reader/writer gaps (block 36), and a third reader/writer gap is estimated in cycles of the disk locked clock at a third servo track in the second servo zone based on the normalized first and second reader/writer gaps (block 38).

In the embodiment of FIG. 2A the control circuitry 28 processes a read signal 40 emanating from the head 22 to demodulate the servo sectors $18_0$-$18_N$ and generate a position error signal (PES) representing an error between the actual position of the head and a target position relative to a target track. The control circuitry 28 filters the PES using suitable compensation filters to generate a control signal 42 applied to a voice coil motor (VCM) 44 which rotates an actuator arm 46 about a pivot, thereby actuating the head 22 radially over the disk 16 in a direction that reduces the PES. The servo sectors $18_0$-$18_N$ may comprise any suitable position information, such as a track and wedge address for coarse positioning and servo bursts for fine positioning as described above with reference to FIG. 1. The servo bursts may comprise any suitable pattern, such as an amplitude based servo pattern as shown in FIG. 1, or a suitable phase based servo pattern.

The reader/writer gap shown in FIG. 2B will span a variable number of clock cycles of the disk locked clock depending on the radial location of the head 22 due to the circumference of the servo tracks increasing toward the outer diameter of the disk.

Figure 2D:
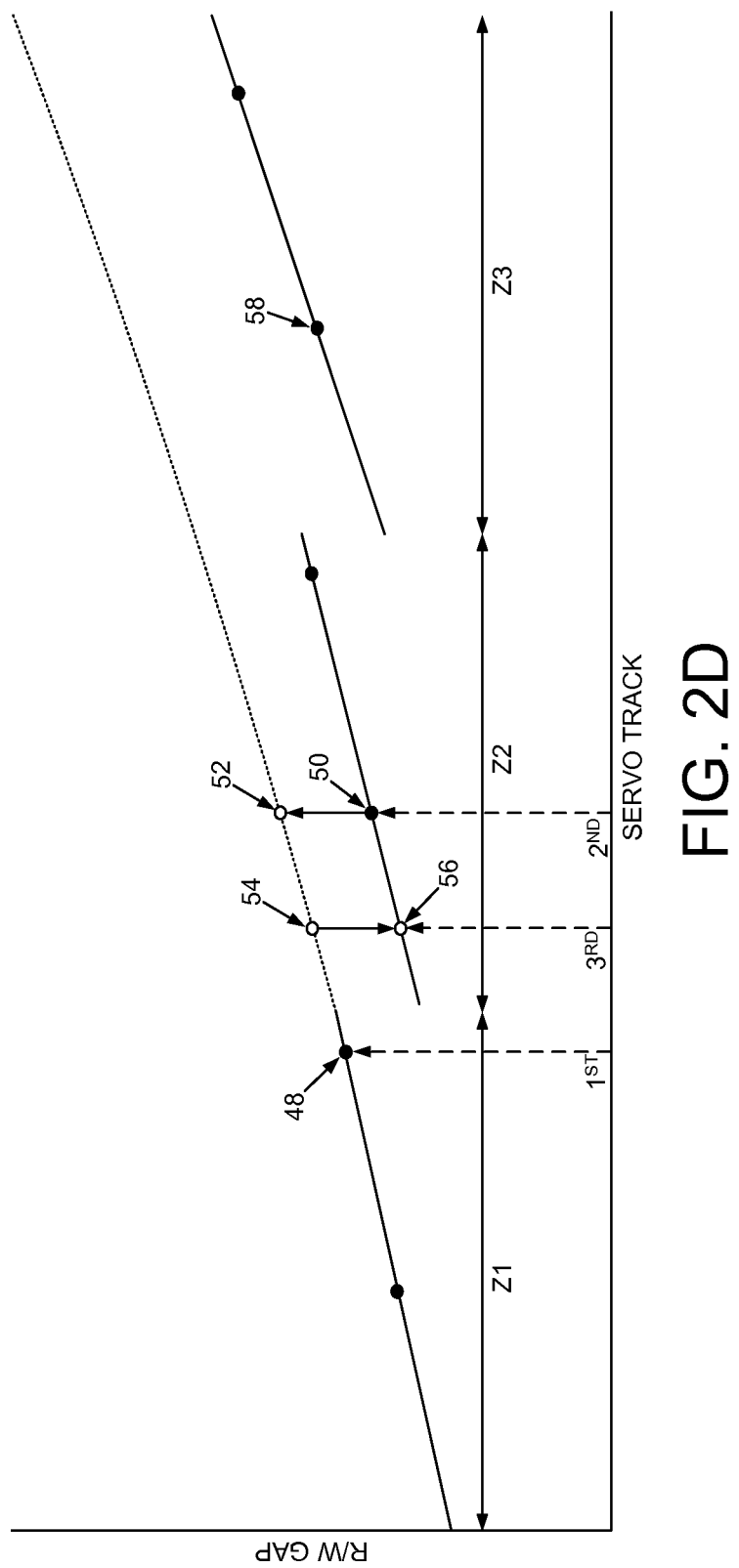
FIG. 2D illustrates an embodiment of the present invention wherein a normalized reader/writer gap is determined through interpolation, and then denormalized to generate the estimated reader/writer gap for the third servo track.

FIG. 2D shows a continuous curve representing the increase in the reader/writer gap (in terms of clock cycles) as the head travels from the outer diameter of the disk to the inner diameter of the disk. Partitioning the disk into a number of servo zones having a decreasing servo data rate toward the inner diameter of the disk results in a segmented curve as illustrated in FIG. 2D, where each segment corresponds to a servo zone. In an embodiment of the present invention, a reader/writer gap is estimated for a third servo track based on normalized reader/writer gap measurements for first and second servo zones.

In the example of FIG. 2D, a first reader/writer gap 48 is measured for a first servo track in a first servo zone (Z1), and a second reader/writer gap 50 is measured for a second servo track in a second servo zone (Z2). The first and second reader/writer gaps 48 and 50 are normalized relative to the servo data rate of the first zone to generate normalized reader/writer gaps 48 and 52. A normalized reader/writer gap 54 is then determined for a third servo track in the second servo zone (Z2) based on the normalized first and second reader/writer gaps 48 and 52 (e.g., using interpolation). The normalized reader/writer gap 54 is then denormalized to estimate the third reader/writer gap 56 in cycles of the disk locked clock at the third servo track in the second servo zone (Z2).

In the example shown in FIG. 2D, the third servo track may be located anywhere within the second zone (Z2) including after the second servo track wherein the normalized reader/writer gap 54 may be computed, for example, through extrapolation. In addition, the second servo zone need not be adjacent the first servo zone. For example, the second servo zone may be servo zone Z3 and a second reader/writer gap 58 measured in the servo zone Z3 for use in estimating a reader/writer gap for a servo track in servo zone Z3 as described above.

Figure 2E:
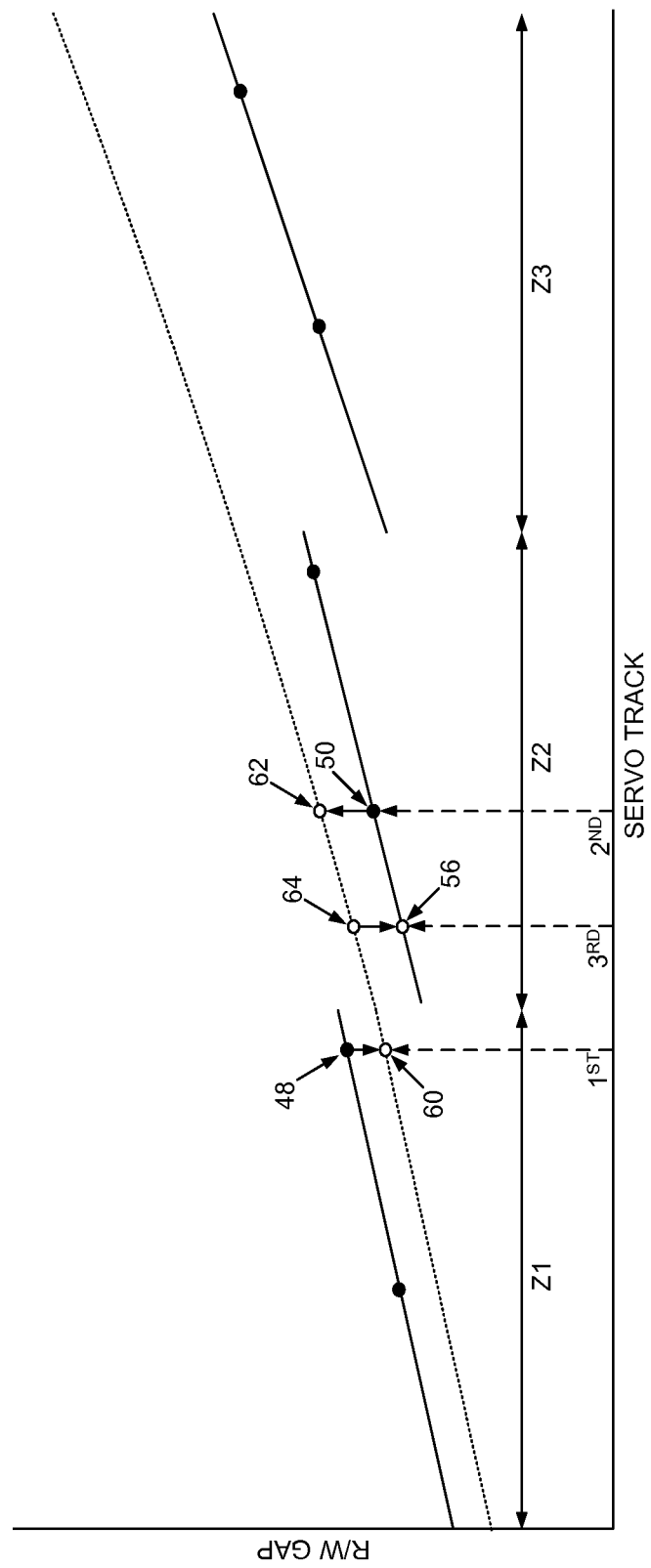
FIG. 2E illustrates an embodiment of the present invention wherein the first and second reader/writer gaps are both normalized relative to a servo data rate between that of the first and second servo zones.

Although in the example of FIG. 2D the reader/writer gaps measured in the first and second servo zones are normalized relative to the servo data rate of the first servo zone, the normalizing may be implemented in any suitable manner, such as normalizing the reader/writer gaps relative to the servo data rate of the second servo zone. FIG. 2E illustrates another embodiment wherein the reader/writer gaps measured in the first and second servo zones (Z1 and Z2) may be normalized relative to an arbitrary servo data rate (between the first and second servo data rates in the example shown). In one embodiment, the reader/writer gaps measured in the first and second servo zones may be normalized relative to a servo data rate that reduces the numerical complexity involved with normalizing and denormalizing the data. After generating the normalized reader/writer gaps 60 and 62, a normalized reader/writer gap 64 is determined for the third servo track which is denormalized to generate the estimated reader/writer gap 56 in cycles of the disk locked clock for the second servo zone (Z2).

Figure 3A:
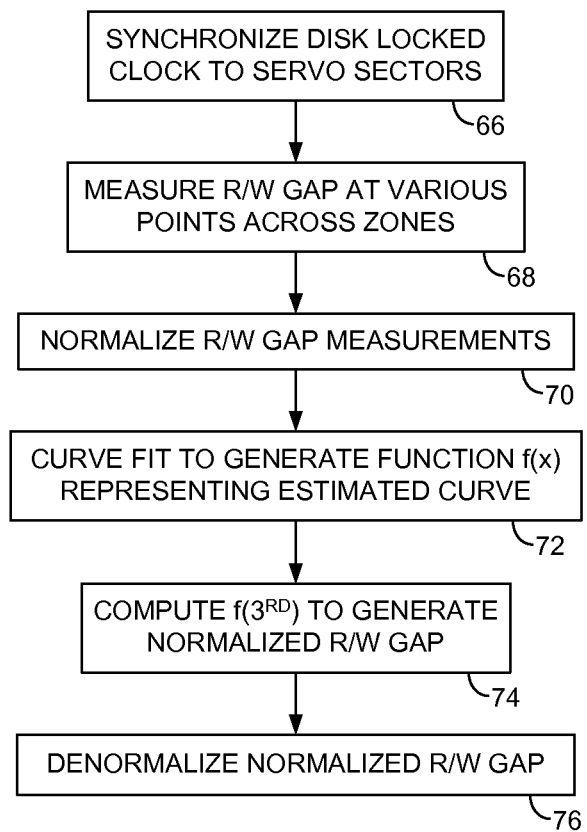
FIG. 3A is a flow diagram according to an embodiment of the present invention wherein the reader/writer gap measurements over multiple servo zones are normalized and then curve fitted to generate a function representing an estimated curve.
Figure 3B:
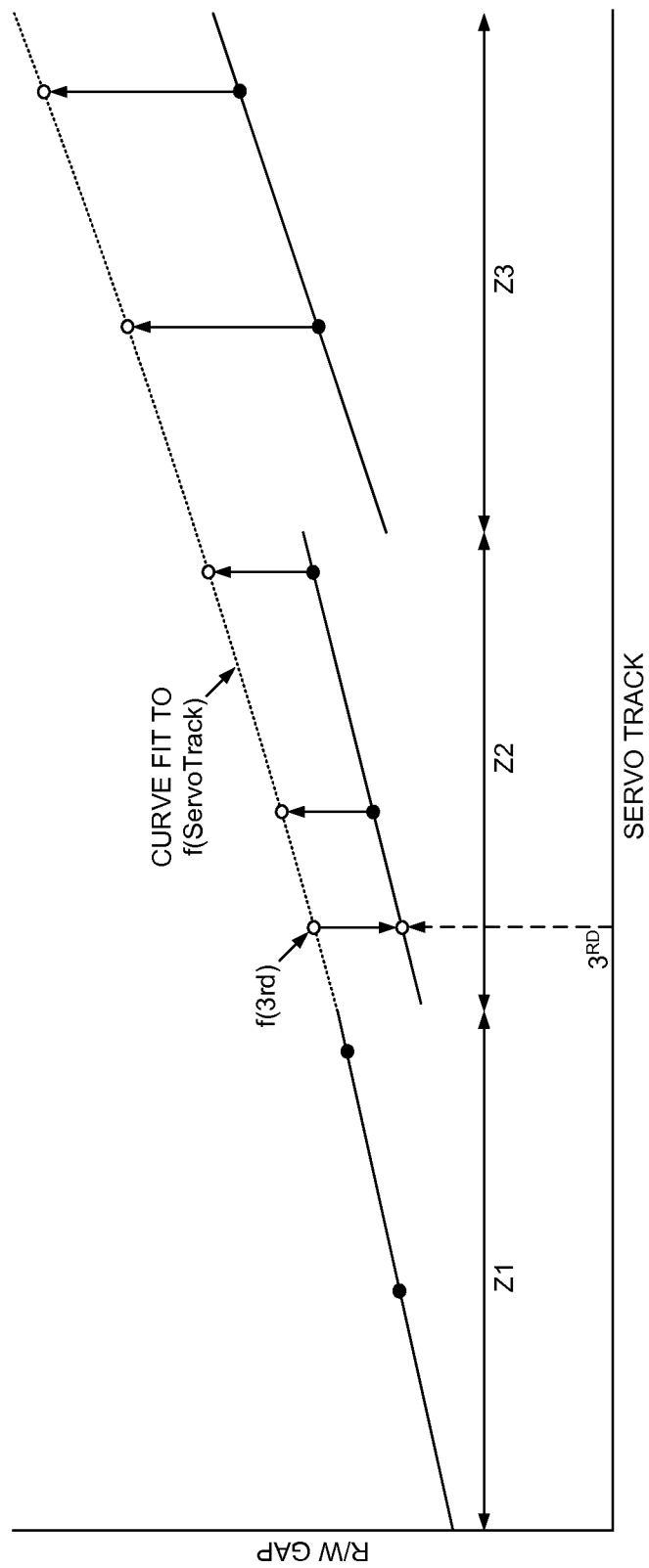
FIG. 3B illustrates an embodiment of the present invention wherein a normalized reader/writer gap is generated based on the function representing the estimated curve, and then denormalized to generate the estimated reader/writer gap for the third servo track.

FIG. 3A is a flow diagram according to an embodiment of the present invention which is understood with reference to the example shown in FIG. 3B. After synchronizing the disk locked clock relative to the servo data rate of each servo zone (block 66), a plurality of reader/writer gaps are measured for at least two of the servo zones (block 68). The measured reader/writer gaps are normalized (block 70), and an estimated curve is fitted to the normalized reader/writer gaps to generate a function representing the estimated curve (block 72) as shown in FIG. 3B. Any suitable function may be generated to represent the estimated curve, such as computing coefficients of a polynomial. A normalized reader/writer gap may then be generated for a third servo track based on the function with the third servo track as an input parameter (block 74). The normalized reader/writer gap is denormalized to estimate the reader/writer gap for the third servo track in clock cycles of the corresponding servo zone (block 76).

Figure 4A:
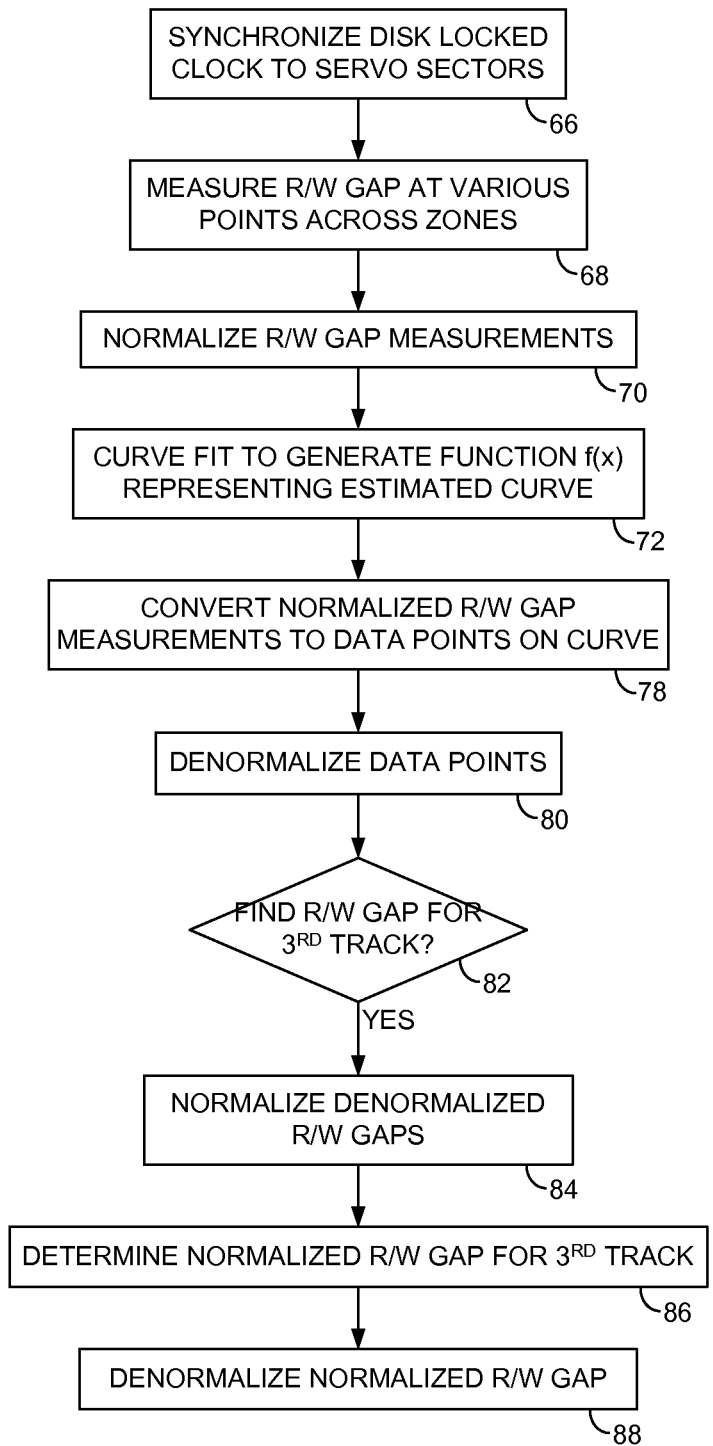
FIG. 4A is a flow diagram according to an embodiment of the present invention wherein the reader/writer gap measurements over multiple servo zones are normalized, curve fitted to generate an estimated curve, the normalized read/writer gaps converted to data points on the estimated curve, and then denormalized.
Figure 4B:
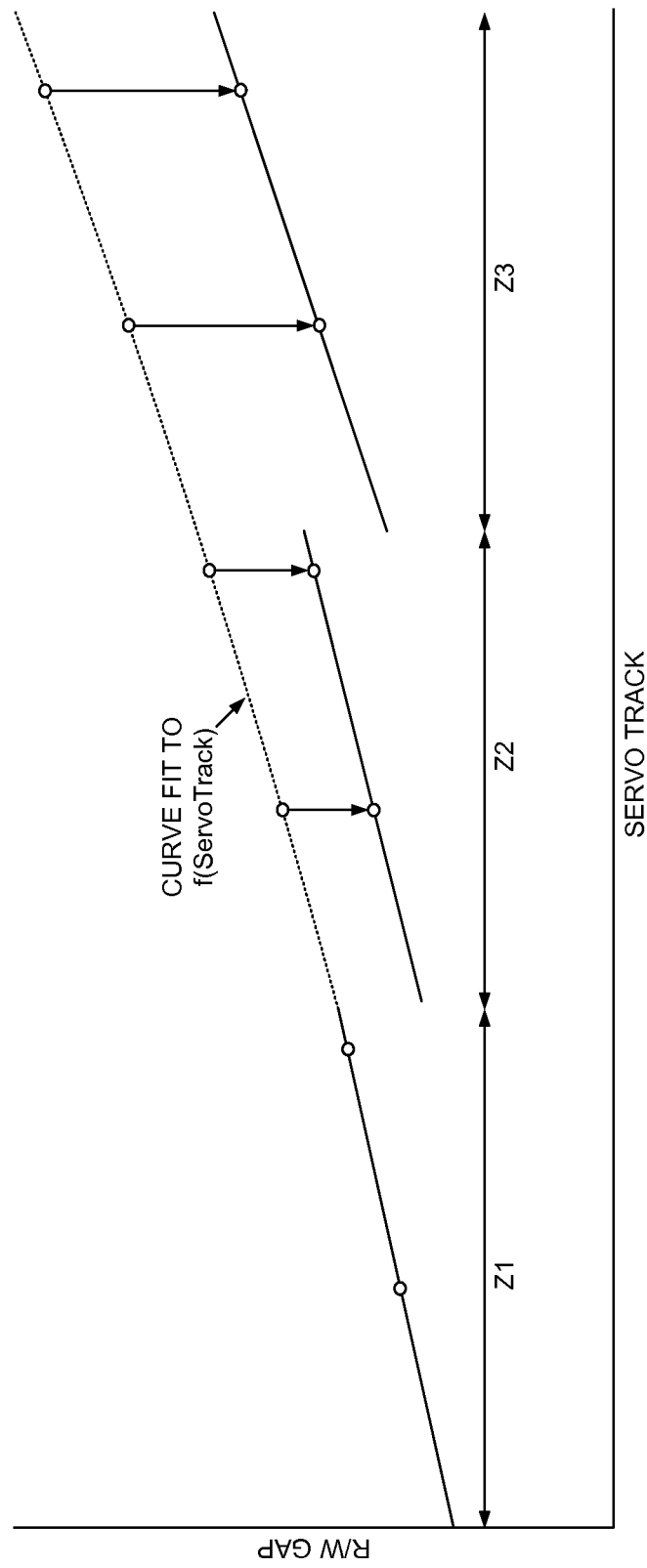
FIG. 4B illustrates an embodiment of the present invention wherein the normalized reader/writer gaps are converted to data points on the estimated curve using a function representing the estimated curve.
Figure 4C:
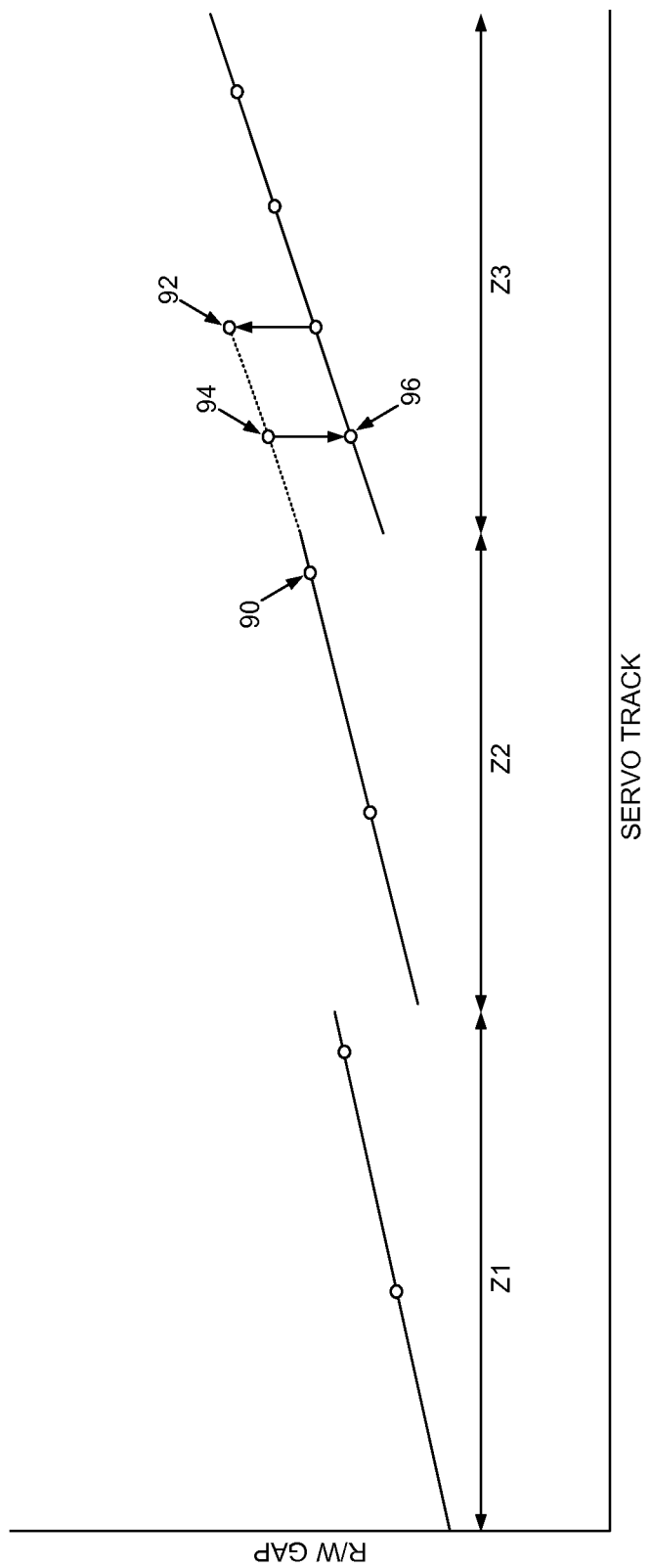
FIG. 4C illustrates an embodiment of the present invention wherein the denormalized reader/writer gaps are normalized to generate a normalized reader/writer gap for the third servo track which is then denormalized.

FIG. 4A is a flow diagram according to an embodiment of the present invention which is understood with reference to the example shown in FIGS. 4B and 4C. After curve fitting the normalized reader/writer gaps to generate an estimated curve (block 72), the normalized reader/writer gaps are converted to data points on the curve (block 78), for example, by computing the data points based on a function representing the estimated curve. The data points on the curve are then denormalized back relative to the servo data rate of the respective servo zones (block 80) as illustrated in FIG. 4B. When a reader/writer gap is to be estimated for a third servo track (block 82), at least first and second reader/writer gaps (denormalized data points) corresponding to first and second servo tracks are normalized (block 84). A normalized reader/writer gap is determined for the third servo track based on the first and second normalized reader/writer gaps (block 86), and the normalized reader/writer gap is denormalized to estimate the reader/writer gap for the third servo track in clock cycles of the respective servo zone (block 88). In the example shown in FIG. 4C, a first normalized reader/writer gap 90 and a second normalized reader/writer gap 92 are used to generate the normalized reader/writer gap 94 for the third servo track. The normalized reader/writer gap 94 is then denormalized to estimate the estimate the reader/writer gap 96 for the third servo track in clock cycles of the respective servo zone (Z3).

Figure 5A:
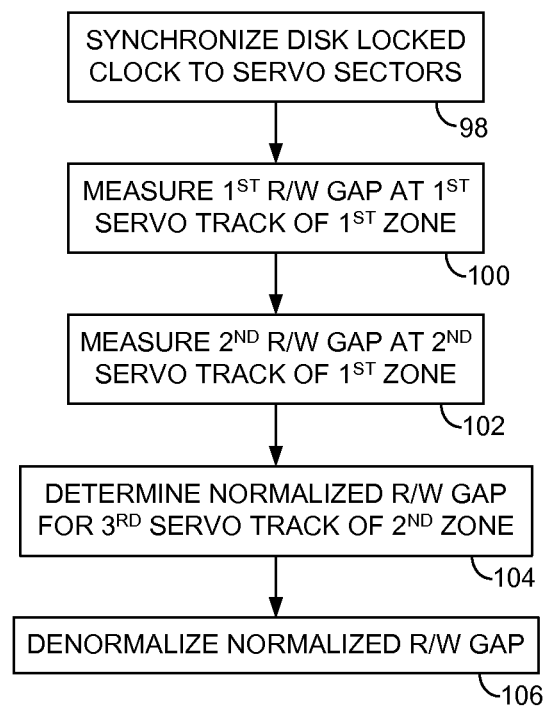
FIG. 5A is a flow diagram according to an embodiment of the present invention wherein reader/writer gaps measured for a first servo zone are curve fitted to generate an estimated curve so that a normalized reader/writer gap measurement can be estimated for a second servo zone based on the estimated curve which is then denormalized.
Figure 5B:
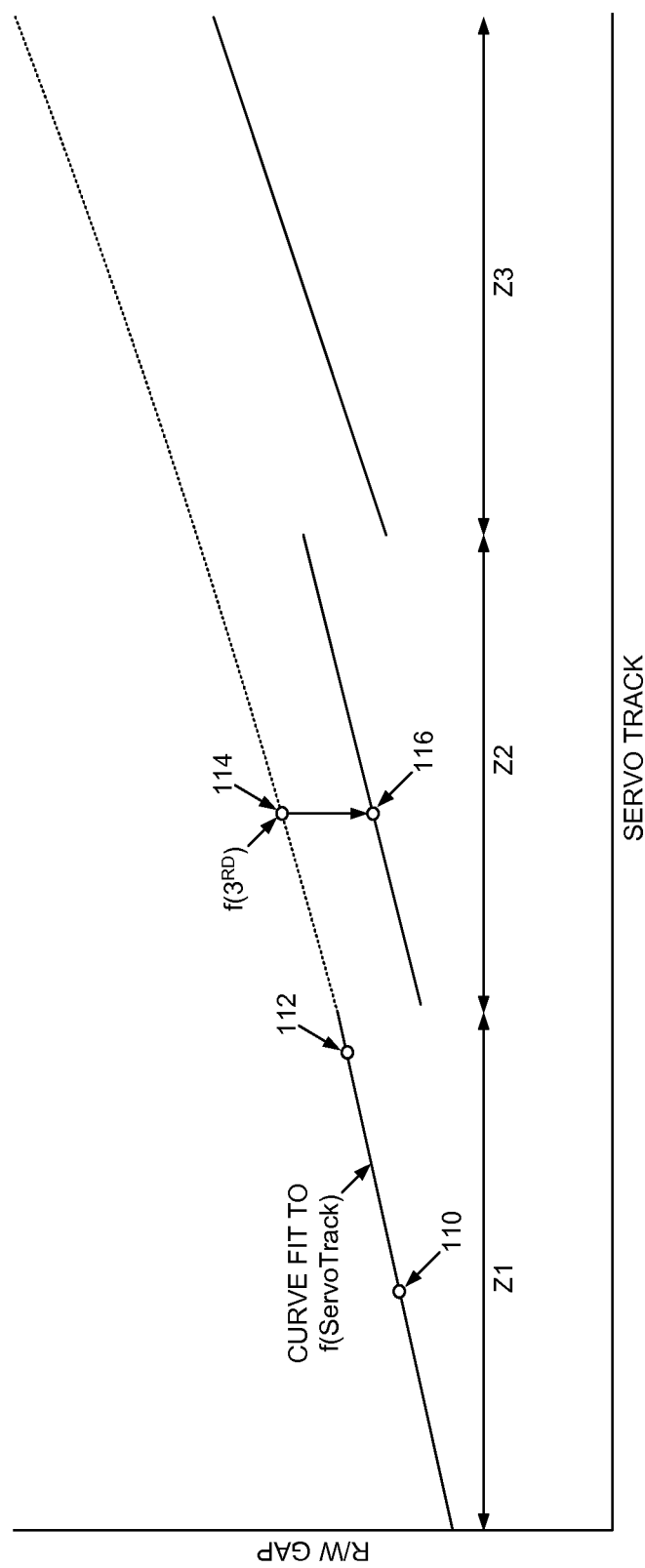
FIG. 5B illustrates an embodiment of the present invention wherein a normalized reader/writer gap for a second servo zone is generated using a function representing the estimated curve which is then denormalized.

FIG. 5A is a flow diagram according to an embodiment of the present invention which is understood with reference to the example shown in FIG. 5B. After synchronizing the disk locked clock relative to the servo data rate of a first servo zone (block 98), a first reader/writer gap 110 is measured in cycles of the disk locked clock at a first servo track in the first servo zone (block 100), and a second reader/writer gap 112 is measured in cycles of the disk locked clock at a second servo track in the first servo zone (block 102). A normalized reader/writer gap 114 is determined for a third servo track in a second servo zone (Z2) based on the first and second reader/writer gaps 110 and 112 (block 104). The normalized reader/writer gap 114 is denormalized (block 106) to estimate a third reader/writer gap 116 in cycles of the disk locked clock at the third servo track in the second servo zone.

In one embodiment, the first and second reader/writer gaps 110 and 112 are curve fitted to generate an estimated curve, and the normalized reader/writer gap 114 for the third servo track in the second servo zone is determined based on the estimated curve. An example of this embodiment is illustrated in FIG. 5B where the normalized reader/writer gap 114 for the third servo track is determined based on a function representing the estimated curve with the third track as an input parameter. Any suitable number of reader/writer gaps may be measured in the first servo zone in order to generate the estimated curve that spans the entire disk as shown in FIG. 5B. Once the estimated curve is generated, a reader/writer gap can be estimated for all of the servo tracks which are denormalized relative to the servo data rates of their respective servo zones.

Figure 6:
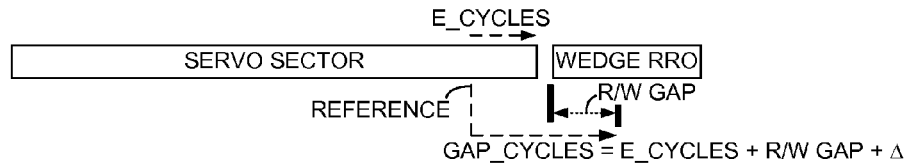
FIG. 6 illustrates an embodiment of the present invention wherein estimating the reader/writer gap across the servo zones helps increase format efficiency by enabling a write operation very soon after the write element clears a servo sector.

FIG. 6 illustrates an embodiment of the present invention wherein the estimated reader/writer gap may be used to time when the write element clears the end of a servo sector, thereby enabling a write operation as soon as possible. The example of FIG. 6 shows additional servo information (wedge repeatable runout (RRO)) being written after a servo sector; however, any suitable data may be written such as user data. Enabling the write operation as soon as the write element clears the end of the servo sector improves the format efficiency of the disk drive.

When the read element reaches a reference point within the servo sector, the control circuitry waits for a number of clock cycles (GAP_CYCLES) before enabling the following write operation. The GAP_CYCLES is equal to a number of clock cycles (E_CYCLES) from the reference point to the end of the servo sector, plus a number of clock cycles (R/W GAP) equal the reader/writer gap estimate, plus a delta (Δ) number of clock cycles to ensure the write element has cleared the end of the servo sector.

Figure 7A:
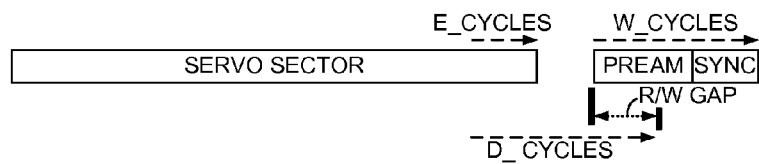
FIGS. 7A and 7B illustrate a technique for measuring the reader/writer gap according to an embodiment of the present invention.
Figure 7B:
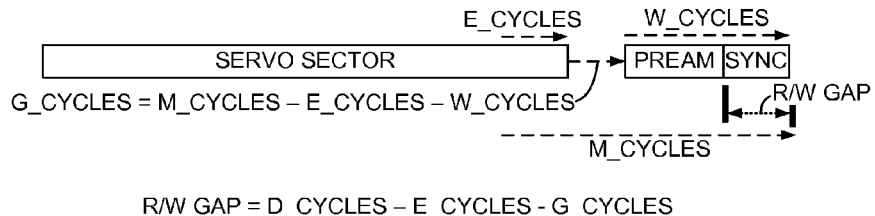

FIGS. 7A and 7B illustrate a technique for measuring the reader/writer gap at any given servo track according to an embodiment of the present invention. When the read element reaches the reference point of a servo sector, the control circuitry waits for a number of clock cycles (D_CYCLES) that ensures the write element is well past the end of the servo sector. The control circuitry then writes a preamble and a sync mark over a number of clock cycles (W_CYCLES) as illustrated in FIG. 7A. The control circuitry then reads the servo sector and measures the number of clock cycles (M_CYCLES) from the reference point to the end of the sync mark (when the sync mark is detected) as illustrated in FIG. 7B. The reader/writer gap in clock cycles (R/W GAP) may then be computed as:

$$R/W\ GAP = D\_CYCLES - E\_CYCLES - G\_CYCLES$$

where $$G\_CYCLES = M\_CYCLES - E\_CYCLES - W\_CYCLES$$

and E_CYCLES is the number of clock cycles from the reference point to the end of the servo sector as shown in FIG. 7A.

Figure 8:
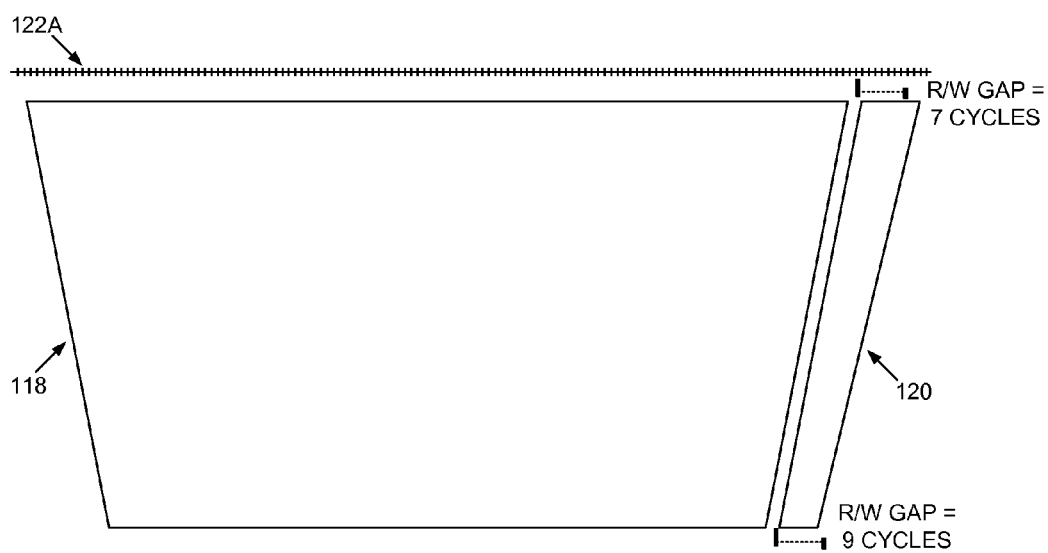
FIG. 8 illustrates how the reader/writer gap in terms of clock cycles varies across the radius of a servo zone.

FIG. 8 shows an example wedge of servo sectors 118 and a wedge of RRO data 120 within a servo zone (e.g., servo zone Z1 in FIG. 2A), as well as the disk locked clock near the outer diameter 122A and the inner diameter 122B. Since the frequency of the disk locked clock remains constant across the servo zone, the number of clock cycles that span the servo zone and RRO data remains constant. Since the circumference of the servo tracks increases toward the outer diameter, the number of clock cycles within the reader/writer gap decreases toward the outer diameter of the disk as illustrated in FIG. 8 (9 cycles at inner diameter and 7 cycles at outer diameter). Accordingly, the embodiments of the present invention enable the reader/writer gap to be estimated across the entire radius of the disk by measuring the reader/writer gap at discrete points, and processing the discrete points (e.g., normalize, interpolate, denormalize) in order to estimate the reader/writer gap for any given servo track.

In the above-described embodiments, the read element 24 leads the write element 26 such that a write operation following a servo sector is delayed until the read element 24 has passed beyond the servo sector by the reader/writer gap. In an alternative embodiment, the write element 26 may lead the read element 24 such that a write operation following a servo sector begins while the read element 24 is still over the servo sector. In this embodiment, the end of a servo sector stores information not needed during a write operation, such as a high order part of a Gray coded track address, or a high order part of a wedge ID, etc. In this manner, reading the servo sector may terminate early to enable the write operation to begin as soon as the write element 26 clears the end of the servo sector.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:
1. A disk drive comprising:
a disk comprising a plurality of servo sectors defining a plurality of servo tracks, wherein:
the servo tracks form a plurality of servo zones; and
a servo data rate of servo sectors in a first servo zone is different than a servo data rate of servo sectors in a second servo zone;

a head actuated radially over the disk, wherein the head comprises a read element separated from a write element by a reader/writer gap; and control circuitry operable to:
- synchronize a disk locked clock relative to the servo data rate of the servo zone the head is over;
- measure a first reader/writer gap in cycles of the disk locked clock at a first servo track in the first servo zone;
- measure a second reader/writer gap in cycles of the disk locked clock at a second servo track in the second servo zone;
- normalize the first and second reader/writer gaps to generate a normalized first and second reader/writer gaps; and
- estimate a third reader/writer gap in cycles of the disk locked clock at a third servo track in the second servo zone based on the normalized first and second reader/writer gaps.

2. The disk drive as recited in claim 1, wherein the control circuitry is further operable to normalize the first and second reader/writer gaps relative to the servo data rate of the first servo zone.

3. The disk drive as recited in claim 1, wherein the control circuitry is further operable to normalize the first and second reader/writer gaps relative to a target servo data rate.

4. The disk drive as recited in claim 1, wherein the control circuitry is further operable to:
- determine a normalized reader/writer gap based on the normalized first and second reader/writer gaps; and
- denormalize the normalized reader/writer gap to estimate the third reader/writer gap in cycles of the disk locked clock at the third servo track in the second servo zone.

5. The disk drive as recited in claim 1, wherein the control circuitry is further operable to:
- curve fit the normalized first and second reader/writer gaps to generate an estimated curve; and
- estimate the third reader/writer gap in cycles of the disk locked clock at the third servo track in the second servo zone based on the estimated curve.

6. The disk drive as recited in claim 5, wherein the control circuitry is further operable to:
- convert the normalized first and second reader/writer gaps to data points on the estimated curve;
- denormalize the data points; and
- estimate the third reader/writer gap in cycles of the disk locked clock at the third servo track in the second servo zone based on at least one of the denormalized data points.

7. The disk drive as recited in claim 5, wherein the control circuitry is further operable to:
- convert the normalized first and second reader/writer gaps to data points on the estimated curve;
- determine a normalized reader/writer gap based on the data points; and
- denormalize the normalized reader/writer gap to estimate the third reader/writer gap in cycles of the disk locked clock at the third servo track in the second servo zone.

8. The disk drive as recited in claim 5, wherein the control circuitry is further operable to:
- generate a function representing the estimated curve; and
- estimate the third reader/writer gap in cycles of the disk locked clock at the third servo track in the second servo zone based on the function.

9. The disk drive as recited in claim 8, wherein the control circuitry is further operable to:
- determine a normalized reader/writer gap based on the function and the third servo track; and
- denormalize the normalized reader/writer gap to estimate the third reader/writer gap in cycles of the disk locked clock at the third servo track in the second servo zone.

10. A disk drive comprising:
a disk comprising a plurality of servo sectors defining a plurality of servo tracks, wherein:
- the servo tracks form a plurality of servo zones; and
- a servo data rate of servo sectors in a first servo zone is different than a servo data rate of servo sectors in a second servo zone;

a head actuated radially over the disk, wherein the head comprises a read element separated from a write element by a reader/writer gap; and control circuitry operable to:
- synchronize a disk locked clock relative to the servo data rate of the first servo zone;
- measure a first reader/writer gap in cycles of the disk locked clock at a first servo track in the first servo zone;
- measure a second reader/writer gap in cycles of the disk locked clock at a second servo track in the first servo zone;
- determine a normalized reader/writer gap for a third servo track in a second servo zone based on the first and second reader/writer gaps; and
- denormalize the normalized reader/writer gap to estimate a third reader/writer gap in cycles of the disk locked clock at the third servo track in the second servo zone.

11. The disk drive as recited in claim 10, wherein the control circuitry is further operable to:
- curve fit the first and second reader/writer gaps to generate an estimated curve; and
- determine the normalized reader/writer gap for the third servo track in the second servo zone based on the estimated curve.

12. A method of operating a disk drive, the disk drive comprising a disk comprising a plurality of servo sectors defining a plurality of servo tracks, wherein the servo tracks form a plurality of servo zones, and a servo data rate of servo sectors in a first servo zone is different than a servo data rate of servo sectors in a second servo zone, the disk drive further comprises a head actuated radially over the disk, wherein the head comprises a read element separated from a write element by a reader/writer gap, the method comprising:
- synchronizing a disk locked clock relative to the servo data rate of the servo zone the head is over;
- measuring a first reader/writer gap in cycles of the disk locked clock at a first servo track in the first servo zone;
- measuring a second reader/writer gap in cycles of the disk locked clock at a second servo track in the second servo zone;
- normalizing the first and second reader/writer gaps to generate a normalized first and second reader/writer gaps; and
- estimating a third reader/writer gap in cycles of the disk locked clock at a third servo track in the second servo zone based on the normalized first and second reader/writer gaps.

13. The method as recited in claim 12, further comprising normalizing the first and second reader/writer gaps relative to the servo data rate of the first servo zone.

14. The method as recited in claim 12, further comprising normalizing the first and second reader/writer gaps relative to a target servo data rate.

15. The method as recited in claim 12, further comprising:
   determining a normalized reader/writer gap based on the normalized first and second reader/writer gaps; and
   denormalizing the normalized reader/writer gap to estimate the third reader/writer gap in cycles of the disk locked clock at the third servo track in the second servo zone.

16. The method as recited in claim 12, further comprising:
   curve fitting the normalized first and second reader/writer gaps to generate an estimated curve; and
   estimating the third reader/writer gap in cycles of the disk locked clock at the third servo track in the second servo zone based on the estimated curve.

17. The method as recited in claim 16, further comprising:
   converting the normalized first and second reader/writer gaps to data points on the estimated curve;
   denormalizing the data points; and
   estimating the third reader/writer gap in cycles of the disk locked clock at the third servo track in the second servo zone based on at least one of the denormalized data points.

18. The method as recited in claim 16, further comprising:
   converting the normalized first and second reader/writer gaps to data points on the estimated curve;
   determining a normalized reader/writer gap based on the data points; and
   denormalizing the normalized reader/writer gap to estimate the third reader/writer gap in cycles of the disk locked clock at the third servo track in the second servo zone.

19. The method as recited in claim 16, further comprising:
   generating a function representing the estimated curve; and
   estimating the third reader/writer gap in cycles of the disk locked clock at the third servo track in the second servo zone based on the function.

20. The method as recited in claim 19, further comprising:
   generating a function representing the estimated curve;
   determining a normalized reader/writer gap based on the function and the third servo track; and
   denormalizing the normalized reader/writer gap to estimate the third reader/writer gap in cycles of the disk locked clock at the third servo track in the second servo zone.

21. A method of operating a disk drive, the disk drive comprising a disk comprising a plurality of servo sectors defining a plurality of servo tracks, wherein the servo tracks form a plurality of servo zones, and a servo data rate of servo sectors in a first servo zone is different than a servo data rate of servo sectors in a second servo zone, the disk drive further comprises a head actuated radially over the disk, wherein the head comprises a read element separated from a write element by a reader/writer gap, the method comprising:
   synchronizing a disk locked clock relative to the servo data rate of the first servo zone;
   measuring a first reader/writer gap in cycles of the disk locked clock at a first servo track in the first servo zone;
   measuring a second reader/writer gap in cycles of the disk locked clock at a second servo track in the first servo zone;
   determining a normalized reader/writer gap for a third servo track in a second servo zone based on the first and second reader/writer gaps; and
   denormalizing the normalized reader/writer gap to estimate a third reader/writer gap in cycles of the disk locked clock at the third servo track in the second servo zone.

22. The method as recited in claim 21, further comprising:
   curve fitting the first and second reader/writer gaps to generate an estimated curve; and
   determining the normalized reader/writer gap for the third servo track in the second servo zone based on the estimated curve.

* * * * *